United States Patent [19]

Satgurunathan et al.

[11] Patent Number: 5,593,730
[45] Date of Patent: Jan. 14, 1997

[54] POWDER COATING COMPOSITION

[75] Inventors: Rajasingham Satgurunathan, Kingsley; David C. Hinde, Wirral; John C. Padget, Frodsham; Stephen G. Yeates, Macclesfield, all of United Kingdom

[73] Assignee: Zeneca Limited, London, England

[21] Appl. No.: 367,352

[22] PCT Filed: Jul. 7, 1993

[86] PCT No.: PCT/GB93/01423

§ 371 Date: Jan. 13, 1995

§ 102(e) Date: Jan. 13, 1995

[87] PCT Pub. No.: WO94/01500

PCT Pub. Date: Jan. 20, 1994

[30] Foreign Application Priority Data

Jul. 14, 1992 [GB] United Kingdom ............... 9214900

[51] Int. Cl.$^6$ .................... C08L 33/02; C08L 37/00; C08L 29/02; C08L 43/04

[52] U.S. Cl. .............. 427/386; 427/385.5; 525/10; 525/119; 525/131; 525/176; 525/183; 525/199; 525/276; 525/426; 525/445; 525/454; 525/455; 525/530; 525/531

[58] Field of Search ............. 525/10, 176, 445, 525/934, 119, 131, 183, 276, 199, 426, 455, 454, 530, 531; 427/385.5, 386

[56] References Cited

U.S. PATENT DOCUMENTS

| | | |
|---|---|---|
| 3,790,645 | 2/1974 | Murayama et al. . |
| 4,191,672 | 3/1980 | Salome ........................ 526/319 |
| 4,499,239 | 2/1985 | Murakami et al. . |
| 4,818,791 | 4/1989 | Murakami ..................... 524/124 |
| 4,824,909 | 4/1989 | Togo .............................. 524/124 |

FOREIGN PATENT DOCUMENTS

| | | |
|---|---|---|
| 250183 | 12/1987 | European Pat. Off. . |
| 0314447 | 5/1989 | European Pat. Off. . |
| 320156 | 6/1989 | European Pat. Off. . |
| 438255 | 7/1991 | European Pat. Off. . |
| 126433 | 10/1977 | Japan . |
| 182382 | 7/1988 | Japan . |
| 898121 | 9/1989 | WIPO . |

OTHER PUBLICATIONS

Patent Abstracts of Japan, vol. 9, No. 324, C–320, abstract of JP, A, 60–155279, Aug. 15, 1985.

*Primary Examiner*—Patricia A. Short
*Attorney, Agent, or Firm*—Cushman Darby & Cushman Intellectual Property Group of Pillsbury Madison & Sutro LLP

[57] ABSTRACT

Powder coating composition which comprises a hybrid polymer system in granular form of a polymer A formable from monomer(s) by aqueous suspension polymerisation and a polymer B, different to A, which polymer system has been obtained using a process which comprises dissolving polymer B in monomeric material to be used in the formation of polymer A, polymerising the monomer(s) to form polymer A using an aqueous suspension polymerisation process, and removing the aqueous phase to form a hybrid of the polymers A and B in granular form, and wherein polymer A and polymer B bear functional groups for imparting curability to the hybrid polymer system, and wherein further the hybrid polymer system has a number average molecular weight within the range of from 1500 to 15,000.

15 Claims, No Drawings

POWDER COATING COMPOSITION

The present invention relates to a certain powder coating composition, and to a process for its preparation. More particularly, the invention relates to a powder coating polymer composition comprising a certain hybrid polymer system prepared by the insitu aqueous suspension polymerisation to form a granular polymer, especially an acrylic polymer, in the presence of another, preformed polymer.

It is well known to employ various polymer types in thermoset powder coating applications. Examples of such polymers include epoxy resins, polyester polymers, acrylic polymers and fluoropolymers. It is desirable for a number of applications to use combinations of different polymers so that e.g. the desirable properties of each polymer provide their contribution to the resulting coating or a desired new effect or appearance is achieved. For example, an acrylic polymer used in combination with a polyester polymer which when crosslinked up can give the enhanced durability of the acrylic polymer in combination with the improved mechanical properties of the polyester, or alternatively can provide a different but desired appearance (e.g. textured rather than glossy or matt).

A number of approaches have been described in the patent literature in order to achieve the degree of admixture necessary to give acceptable or required performance. JA88-182382 describes a polyester-acrylic hybrid prepared under conditions of melt transesterification to induce limited grafting. However the reaction conditions are such that control of melt viscosity due to premature reaction can be problematic. JA77-126433 describes the preparation of a carboxyl functional polyester in solvent and the subsequent insitu solution polymerisation to form an acrylic polymer followed by solvent stripping and solid polymer recovery. More typically, blending is achieved by coextrusion (EP 0314447, U.S. Pat. No. 4,499,239) although problems in achieving completely homogeneous mixing may be encountered.

An additional limitation is that these approaches may not allow certain ratios of either type of polymer to be prepared.

For example, binder compositions for use in powder coatings are disclosed in U.S. Pat. No. 4,499,239, which describes a resin composition consisting substantially of 60–97 wt. % of a polyester with an acid number between 15 and 200 and 3–40 wt. % of a glycidyl acrylate polymer. A disadvantage of the compositions of U.S. Pat. No. 4,499,239 is thought to be that the described mixtures have a maximum polyacrylate resin content of only 40 wt. % since at higher amounts by weight this resin is insufficiently miscible with the polyester resin also employed. As a result, the resins cannot be mixed in all the necessary ratios for the desired applications.

We have now discovered certain polymer compositions which are particularly useful for powder coating applications and do not suffer from the drawbacks discussed above.

According to the present invention there is provided a powder coating composition which comprises a hybrid polymer system in granular form of a polymer A formable from monomer(s) by aqueous suspension polymerisation and a polymer B, different to A, which polymer system has been obtained using a process which comprises dissolving polymer B in monomeric material to be used in the formation of polymer A, polymerising the monomer(s) to form polymer A using an aqueous suspension polymerisation process, and removing the aqueous phase to form a hybrid of the polymers A and B in granular form, and wherein polymer A and polymer B bear functional groups for imparting curability to the hybrid polymer system, and wherein further the hybrid polymer system has a number average molecular weight within the range of from 1500 to 15,000.

There is also provided according to the invention a process for the production of a powder coating composition, said composition comprising a hybrid polymer system in granular form of a polymer A formable from monomer(s) by aqueous suspension polymerisation and a polymer B, different to A, wherein said process comprises dissolving polymer B in monomeric material to be used in the formation of polymer A, polymerising the monomer(s) to form polymer A using an aqueous suspension polymerisation process, and removing the aqueous phase to form a hybrid of the polymers A and B in granular form, and wherein polymer A and polymer B bear functional groups for imparting curability to the hybrid polymer system, and wherein further the hybrid polymer system has a number average molecular weight within the range of from 1500 to 15,000.

There is further provided the use of a powder coating composition as defined above in powder coating, and a process of powder coating using such a composition.

(For the purposes of this specification, the term "polymer" is intended to embrace "oligomer", i.e. low molecular weight polymer).

The hybrid polymer system of polymers A and B in granular form is a composite polymer composition of the polymers A and B in the form of granular particles, the granular nature of the composite system resulting from the aqueous suspension polymerisation of the monomer(s) to form polymer A.

The composite or hybrid polymer composition as defined is easily prepared, includes both polymers in an intimate admixture, is easily and cleanly isolated (harvested), and is readily employed in powder coating applications since it possesses the characteristics typical of suspension (granular) polymers. Moreover, the polymers in the composition can be more intimately mixed than when admixture is achieved by merely blending pre-formed polymers.

The advantages of using the process as defined for the preparation of the composition are thus as follows:

(1) More intimate admixture is possible than can be achieved by simple blending operations (e.g. melt-extrusion).

(2) Insitu polymerisation of polymer A may be carried out at relatively low temperatures and consequently any premature reactions between polymers A and B can be strictly controlled or eliminated altogether.

(3) In the case where the functional groups on polymer A and polymer B render the polymers capable of crosslinking (at conventional powder coating temperatures, where Tcure>>Tpolym.) without the need for formulation with a crosslinking agent (see later) then the granular powders may be used directly, after grinding if necessary, without additional formulation (e.g. by extrusion) to incorporate a crosslinking agent.

An essential feature of the present invention is that the polymer B is soluble in monomer or monomer mixture, at the intended level of incorporation, used to make the polymer A. This is necessary to achieve the desired intimate admixture and also a trouble-free suspension polymerisation process. Consequent on this, and also for achieving the low hybrid molecular weight as defined, the polymer B will normally be of fairly low molecular weight. Typically, the number average molecular weight (Mn) of the polymer B will be within the range of from 750 to 30,000 (sometimes 5,000 to 30,000). For some powder coating applications a range of Mn of from 1000 to 25,000 for B is particularly useful. (The measurement of Mn is well known to those skilled in the art, and may e.g. be effected using gel permeation chromatography in conjunction with a standard such as polystyrene of known molecular weight).

Examples of polymer B include:

(1) Condensation polymers, such as polyesters, polyurethanes, polyurethane-ureas, epoxy polymers and polyamides.

(2) Addition polymers such as floroolefine polymers.

Polymer B could e.g. be made by addition or condensation polymerisation (as appropriate) and could be made using known techniques such as bulk, suspension, solution or emulsion polymerisation; it is usually isolated before dissolution in the monomer(s) used to make polymer A (although it could in principle in some cases be made in the presence of the selected monomer composition for making polymer A so as to become dissolved therein as made).

The polymer B is a functionalised polymer having functional groups which impart to the hybrid polymer system (in conjunction with the functional groups of polymer A) the property of curability (i.e. crosslinkability); such functional groups include hydroxyl, carboxyl, glycidyl, amino and siloxane groups. The functional groups in a polymer may be incorporated directly by employing an appropriately functionalised monomer as at least one of the monomers used to prepare the polymer. Functional groups could also be incorporated into a polymer by reaction of suitable groups in the polymer with appropriate functionalising reagents (for example, carboxyl functionality could be introduced into a polymer by reacting at least some of the hydroxyl groups of a hydroxyl functional polymer with a dicarboxylic acid or carboxylic acid anhydride compound).

Polymer A is also a functionalised polymer having functional groups which impart curability to the hybrid polymer system (in conjunction with the functional groups of polymer B). Polymer A is in particular a functionalised acrylic copolymer.

It is envisaged that polymer A and polymer B could possess the same functionality and that crosslinkability is capable of being achieved by subsequent formulation with another coreactive component having two or more groups each-reactive with said same functional groups of polymers A and B and acting as a crosslinking agent. For example, said same functional groups of the polymers A and B could be carboxyl groups and the subsequently formulated coreactive compound (acting as a crosslinking agent) could be a polyepoxide compound or a polyhydroxy compound (in which the hydroxyls are activated—as in a polyhydroxy alkylamide for example). Or said same functional groups could be e.g. hydroxyl groups and the subsequently formulated coreactive compound (acting as a crosslinking agent) could be a blocked polyisocyanate compound or a melamine/formaldehyde resin.

It is also envisaged that polymer A and polymer B could have different but complementary functionalities which are coreactive so as to be capable of causing self-crosslinking (i.e. in the absence of a subsequently formulated crosslinking agent). For example, the complementary functionalities could be carboxyl and hydroxyl groups; or carboxyl and glycidyl groups. It would also be possible for polymers A and B to possess more than one type of functional group. For example polymers A and B could both possess carboxyl and hydroxyl groups, so that crosslinking could be effected by reaction between the hydroxyl groups of one polymer and the carboxyl groups of the other. However, crosslinking could also be effected by subsequently formulating with a crosslinking agent reactive with the hydroxyl groups or carboxyl groups of each polymer.

It should be appreciated that the invention compositions are not restricted to having a single polymer B incorporated with polymer A, and could have more than one such polymer.

The preferred process for making the invention composition comprises predissolving polymer B in all or a part of the monomer material used for making polymer A (e.g. all or part of the monomer feed if a feed process is employed). This modified monomeric material (e.g. modified monomer feed) is then used as for a conventional aqueous suspension process.

Another possible process comprises adding polymer B plus a suspension agent (as used in suspension polymerisations) to the aqueous phase to be used in the suspension polymerisation and heating to disperse polymer B in the aqueous phase (e.g. to 50°–70° C). Once dispersion is wholly or partially complete the monomer(s) for A are added to effect solubilisation of polymer A and polymerisation to polymer A effected.

The invention composition preferably has polymers A and B in a weight/weight ratio within the range of from 95/5 to 25/75, more preferably 95/5 to 50/50.

A further essential feature of the invention is that polymer A is formable by an aqueous suspension polymerisation process. Examples of such polymers particularly include olefinic addition polymers. Furthermore, the polymer A is also functionalised as defined, and, again, examples of functional groups for A which can impart curability to the hybrid polymer system are hydroxyl, carboxyl, glycidyl, amino, and siloxane groups. Such functional groups may be incorporated by employing an appropriately functionalised comonomer as at least one of the monomers used to prepare the polymer.

By an "olefinic addition polymer" is meant a polymer formed by the free-radical addition polymerisation of at least one olefinically unsaturated monomer, provided that such a polymer can be formed by an aqueous suspension polymerisation process.

Examples of such monomers which may be used in such polymerisations include 1,3-butadiene, isoprene, styrene, divinyl benzene, acrylonitrile, methacrylonitrile, vinyl halides such as vinylidene chloride and vinyl chloride, vinyl esters such as vinyl acetate, vinyl propionate and vinyl laurate, heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $$CH_2=CR^1COOR^2$$

where $R^1$ is H or methyl and $R^2$ is (cyclo)alkyl of 1 to 20 carbon atoms (more preferably 1 to 6 carbon atoms) examples of which are methyl acrylate, methyl methacrylate, ethyl acrylate, ethyl methacrylate, n-butyl acrylate, n-butyl methacrylate, isopropyl acrylate, isopropyl methacrylate, n-propyl acrylate, n-propyl methacrylate, cyclohexyl acrylate and cyclohexyl methacrylate.

The olefinic addition polymer should of course comprise repeat units derived from at least one olefinically unsaturated functionalised monomer for providing functional groups in the polymer which impart curability to the resulting hybrid polymer system (such as hydroxyl, carboxyl, glycidyl, amino and siloxane groups). The olefinic addition polymer will normally contain 1–50 weight % (1–20 weight %) of units of such functionalised monomer(s) together with the corresponding amount of non-functionalised monomer units, e.g. one or more of the non-functionalised monomers illustrated supra. Examples of functionalised monomers include those of formula $CH_2=CR^3CO_2R^4$ where $R^3$ is H or methyl and $R^4$ is H, $NH_2$, hydroxyalkyl or hydroxycycloalkyl of 1 to 20 carbon atoms (more preferably 1 to 6 carbon atoms), dialkylaminoalkyl or glycidyl, examples of which include acrylic acid, β-carboxy ethacrylate, methacrylic acid, acrylamide, methacrylamide, 2-hydroxyethyl methacrylate, 2-hydroxyethyl acrylate, glycidyl acrylate, glycidyl methacrylate and dimethylaminoethyl methacrylate.

The olefinic addition polymers are, for example, vinyl chloride copolymers, styrene copolymers, and acrylic copolymers.

In an advantageous embodiment of the invention, the polymer A is an acrylic copolymer as mentioned above. By an acrylic copolymer is meant herein a polymer comprising a high level of repeat units (e.g. 40 to 99 weight %, more preferably 50 to 99 weight %) derived from at least one (meth)acrylate having the formula as defined supra, i.e. $CH_2=CR^1COOR^2$ where $R^1$ is H or methyl and $R^2$ is (cyclo)alkyl of 1 to 20 carbon atoms (more preferably 1 to 6 carbon atoms). Examples of these are, in particular, methyl acrylate, methyl methacrylate, ethyl acrylate, ethyl methacrylate, n-butyl acrylate, cyclohexyl acrylate and cyclohexyl methacrylate. The acrylic copolymer also comprises repeat units derived from at least one olefinically unsaturated monomer which is not a (meth)acrylate as defined above. This other type of monomer(s) should include a functionalised monomer(s) for providing functional groups in the polymer (usually directly but possibly after reaction of resulting polymer-bound groups with a suitable reagent) but could also include as an option a non-functionalised monomer(s) which is not a (meth)acrylate (where functionalised is as discussed above). Again, examples of functional groups for the acrylic copolymer which can impart curability to the resulting hybrid polymer system are hydroxyl, carboxyl, glycidyl, amino and siloxane groups. Examples of functionalised monomers include those of formula $CH_2=CR^3CO_2R^4$, specific examples of which were given above.

The acrylic copolymer will typically contain 40–99 weight % (50–99 weight %) of units derived from (meth)acrylate monomer(s) of formula $CH_2=CR^1COOR^2$ and 1–60 weight % (1–50 weight %) of units derived from at least one other olefinically unsaturated monomer (which should include at least one functionalised monomer but may optionally include at least one non-functionalised monomer). Examples of functionalised monomers include hydroxyethyl acrylate or methacrylate, glycidyl acrylate or methacrylate, acrylic or methacrylic acid, acrylamide and methacrylamide. Examples of non-functionalised non-(meth)acrylate monomers include hydrocarbon monomers e.g. butadiene, isoprene, and styrene; vinyl halides, e.g. vinylidene chloride; vinyl esters; and vinyl ethers. Multiolefinically unsaturated monomers such as diallyl phthalate and allyl methacrylate may also be included as comonomers (and not just in acrylic polymers but in olefinic addition polymers generally).

The aqueous suspension polymerisation of monomer(s) to form the polymer A (having the polymer B dissolved therein) may be conducted using a suspension agent system and a free-radical-yielding monomer-soluble initiator or combination of inititiators.

The suspension agent employed in the suspension polymerisation process is normally one or more of those used generally for the polymerisation of olefinically unsaturated monomers in aqueous suspension. Examples of these include protective colloids such as partially hydrolysed polyvinyl acetate (various degrees of hydrolysis), gelatin, polyvinyl pyrrolidone, polyacrylic acid, and cellulose derivatives, e.g. methyl cellulose, carboxymethyl cellulose and hyroxyethyl cellulose. The suspension agent may be used in a conventional quantity—generally speaking from 0.01 to 8% by weight (0.01 to 6%) calculated on monomer weight.

Any suitable free-radical yielding polymerisation initiator (or combination of initiators) that is monomer-soluble may be used in the suspension polymerisation process. Examples of these include peroxy compounds such as di-tertiarybutyl peroxide, acyl peroxides such as lauroyl peroxide and benzoyl peroxide, acetyl cyclohexyl sulphonyl peroxide, peresters such as tertiarybutyl peroctoate, percarbonates and azo compounds such as azo-bis-iso-butyronitrile and 2,2'-azo-bis-2,4-dimethyl-valero-nitrile. Monomer-soluble free-radical-yielding polymerisation initiators that are particularly suitable for use in the polymerisation process for making acrylic polymer are the acyl peroxides such as benzoyl peroxide and lauroyl peroxide, and azo compounds such as azo-bis-isobutyro-nitrile. The initiator(s) may be used in a conventional quantity—generally speaking from 0.1 to 10% by weight (0.1 to 6%) calculated on monomer weight.

The powder coating composition of the invention is such that the overall number average molecular weight of the polymer composition (i.e. of the hybrid polymer system) is within the range 1500 to 15,000, and is preferably within the range 2000 to 15,000, particularly 2,000 to 12,000 (sometimes 5,000 to 15,000). Accordingly, the polymer A produced by the suspension polymerisation will usually also be of relatively low molecular weight, and preferably has Mn within the range 1500 to 15,000, particularly 2,000 to 15,000 (sometimes 5,000 to 15,000). In order to achieve such low molecular weight, the suspension polymerisation can be carried out in the presence of a chain transfer agent. Examples of chain transfer agents are mercaptans (e.g. alkane thiols), aldehydes, hydrocarbons, chlorohydrocarbons and certain olefines (such as cyclohexene). We have, in this respect, found that alpha-methylstyrene (and its dimer) may e.g. be useful as a monomer when making low molecular weight acrylic copolymers since it also acts as a chain transfer agent. The level of chain transfer agent, if used, will usually be within the range of from 1 to 20 wt % (more preferably 1 to 10 wt %, particularly 2 to 8 wt %) based on the weight of the monomer material used for the suspension polymerisation.

The use of high levels of initiators (e.g. working at the higher levels of the exemplified ranges quoted above) can also contribute to the achievement of such low molecular weight.

The operating temperature conditions for the suspension polymerisation will obviously depend on the particular monomer(s) being polymerised, but polymerisation temperatures will often be within the range of 40° to 95° C. when making acrylic copolymers.

In one embodiment of the invention at least 50 weight % of the monomer material to be polymerised (more preferably at least 80 weight % and particularly 100 weight % i.e. all) is fed to a heated aqueous polymerisation zone (continuously or discontinuously over a period of time e.g. 0.5 to 3 hours) in which the polymerisation reaction takes place.

The suspension agent may be present initially in the reaction zone, or in the monomer feed (usually carried in water), or in both. The same applies to the chain transfer agent (if used) (usually in monomer). The same also applies to the initiator, although more usually this will be present only in the feed mixture. Such a procedure allows a particularly clean, coagulum- or aggregate-free suspension to be obtained.

A wholly batch suspension polymerisation process, i.e. with all (or substantially all) of the monomer(s) to be polymerised being present in the polymerisation zone right from the start, nevertheless provides an acceptable product as well.

The resulting suspension produced from the polymerisation to make polymer A may be worked up in conventional manner e.g. by filtering or centrifuging to remove the bulk of the aqueous phase (to give "wet cake"), optionally washing (if necessary), and drying to remove the remainder of the water. When operating on a large scale, residual monomer(s) from the polymerisation should be removed if necessary from the suspension before water removal.

The resulting granular product may range from a fine beaded product, to a larger-grained granular powder product according to the particular stabilisation conditions prevailing during the polymerisation reaction, particularly with regard to the type of suspension agent used and its concentration. Optimisation of the type and amount of suspension agent may be readily carried out according to the type of product desired. Generally speaking, the hybrid polymer system of the powder coating composition will usually have an average particle size within the range of from 30 to 500 μm (50 to 300 μm).

Other materials may also be employed in the suspension polymerisation, e.g. defoamers, auxiliary surfactants (e.g. to promote properties such as increased porosity), electrolytes (like $Na_2SO_4$), and buffers.

In one advantageous embodiment of the invention, the polymer B is a fluorocopolymer, by which we mean a fluorine-containing addition copolymer. Such polymers possess particularly desirable properties (e.g. excellent durability, weatherability, chemical and thermal resistance, stain resistance, and gloss). The fluorocopolymer will typically comprise repeat units derived from at least one fuoroolefine and at least one olefinically unsaturated monomer which is not a fluoroolefine. Such fluorocopolymers may be prepared by conventional free-radical addition polymerisation processes (e.g. by polymerisation in aqueous emulsion, in aqueous suspension, in solution or in bulk). Isolation from the polymerisation medium will usually be necessary before dissolution in the monomer(s) for polymer A. Some such fluorocopolymers are commercially available.

Typically a fluorocopolymer (if used in the composition) will comprise 30–99 weight of units derived from at least one fluoroolefine and 1–70 weight % of other units (i.e. derived from at least one olefinically unsaturated monomer which is not a fluoroolefine).

A fluoroolefine is broadly defined herein as an olefine having at least one fluorine atom substituent; often the fluoroolefine is a perhaloolefine in which all the hydrogen atoms of the olefine are substituted with fluorine atoms and optionally other halogen atoms.

From the point of view of polymerisability and resulting polymer properties fluoroolefines having 2 or 3 carbon atoms are preferable.

Examples of such fluoroolefines include fluoroethylenes such as $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$; and fluoropropylenes such as $CF_3CF=CF_2$, $CF_3CF=CHF$, $CF_3CH=CF_2$, $CF_3CH=CF_2$, $CF_3CF=CHF$, $CHF_2CH=CHF$ and $CF_3CH=CH_2$.

Of the fluoroethylenes and fluoropropylenes listed above tetrafluoroethylene ($CF_2=CF_2$), chlorotrifluoroethylene ($CClF=CF_2$), vinylidene fluoride ($CH_2=CF_2$), and hexafluoropropylene ($CF_2=CFCF_3$) are particularly preferred.

The use of the above exemplified fluoroolefines either singly or in admixture is of course included within the scope of the present invention.

The non-fluorolefinic monomer(s) should include at least one functionalised monomer for providing functional groups in the polymer (usually directly but possibly after reaction of resulting polymer-bound groups with a suitable reagent) but can optionally also include at least one non-functionalised monomer.

Examples of suitable olefinically unsaturated comonomers bearing at least one functional group which are copolymerisable with fluoroolefines are hydroxy, or amino vinyl ethers of formula:

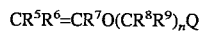

$CR^5R^6=CR^7O(CR^8R^9)_nQ$ where $R^5$, $R^6$, $R^7$, $R^8$, $R^9$ may be independently H, alkyl or fluoroalkyl (preferably of 1 to 5 carbon atoms), or halogen (preferably F, Cl), n is 2 to 8 and Q is OH or NH2. Usually $R^5=R^6=R^7=R^8=R^9=H$, Q is OH and n is 2 to 6. Examples of such vinyl ethers are 2-hydroxyethyl vinyl ether, 3-hydroxy(n)butyl vinyl ether, 4-hydroxy(n)butyl vinyl ether, 3-hydroxy(n)propyl vinyl ether, 5-hydroxy(n)pentyl vinyl ether, and 6-hydroxy(n)hexyl vinyl ether. Other possible functional vinyl ethers include:
2,3-dihyroxypropyl vinyl ether;
3-hydroxy-2,2-dimthylpropyl vinyl ether;
2-methyl-2-hydroxymethyl-3-hydroxypropyl vinyl ether;
3-(hydroxymethyl)-5-hydroxypentyl vinyl ether;
2,2-bis(hydroxymethyl)-3-hydroxypropyl vinyl ether;
1-hydroxymethyl-4-vinyloxymethylcyclohexane; and 2-[2-hydroxyethoxy]ethyl vinyl ether.

Carboxylic acid functionality could be introduced into the fluorocopolymer by reacting some of the hydroxyl groups of a hydroxyl-functional fluorocopolymer with a dicarboxylic acid or carboxylic acid anhydride compound.

Examples of non-functional non-fluoroolefinic monomers include: alkyl, aryl or cycloalkyl vinyl ethers (or fluoro-substituted derivatives thereof) such as cyclohexyl vinyl ether, ethyl vinyl ether, n-propyl vinyl ether, n-butyl vinyl ether, cyclopentyl vinyl ether; and vinyl esters (or the fluorinated derivatives thereof) such as $CH_2=CHOCOCH_3$ (vinyl acetate), $CH_2=CHOCOC(CH_3)(C_2H_5)([CH_2]_4CH_3)$, $CH_2=CHOCOC(CH_3)_2([CH_2]_5CH_3)$, and $CH_2=CHOCOPh$ (Ph is phenyl). Other possible monomers include alpha-olefines such as ethylene, propylene, isobutylene, and butene-1. Such additional units may usefully be used to control the glass transition temperature of the final polymer composition.

In another advantageous embodiment of the invention, the polymer B is a polyester, and is acid and/or hydroxyl functional.

Polyester resins are composed substantially of units of dicarboxylic acids, glycols and (often) of three or higher functional acidic or alcoholic monomers. Typical polycarboxylic acids include terephthalic acid, isophthalic acid, 1,4 cyclohexane dicarboxylic acid, and adipic acid. In minor amounts (up to 5 mole %) monocarboxylic acids such as benzoic acid can be used. Typical glycols include aliphatic glycols. Aliphatic diols can be used such as for instance ethylene glycol, 1,2-propanediol, 1,3-propanediol, 2,5-hexanediol pentane diol, 2,2-[bis(4-hydroxy-cyclohexyl)]-propane, 1,4 dimethylolcyclohexane and 2,2,4-trimethyl-1,3-pentanediol, as well as smaller amounts of higher polyols such as glycerol, hexanetriol, pentaerythritol, sorbitol, trimethylol ethane, trimethylol propane and tris-(2-hydroxyl-)isocyanurate. Alternatively instead of diols and higher polyols, epoxy compounds can be employed.

It has been found that careful monomer selection is important in achieving good solubility of the polyester in (meth)acrylate monomers (if the latter are used). As a rule the higher the aliphatic glycol content the better the compatability of polymers A and B and this content is preferably ≦75 mole % of the alcoholic monomers used in the polyester synthesis. Additionally, not all levels of terephthalic acid content (if used) are accessable and preferably the level of terephthalic acid should not exceed 50 mole % of the acid monomers used in the polyester synthesis.

Polyesters can be prepared by standard methodology such as esterification or trans-esterification. Optionally polyester preparation can be carried out in the presence of standard catalysts such as for example, dibutyltin oxide or tetrabutyl titanate. Depending on the choice of synthesis and of the COOH:OH ratio, final products can be obtained having desired acid numbers and hydroxyl numbers.

The amount of three or higher functional monomer used in the synthesis of the polyester is preferably lower than 8 mole % relative to the other monomers, and more preferably lower than 4.5 mole %. The number average molecular weight (Mn) of the polyester is often between 1,000 and 7,000 and more preferably is between 1,000 and 5,000.

If the polyester is primarily acid functional then the acid number is preferably between 20 and 150 mgKOH/g of polymer (more preferably 20 to 100 mgKOH/g) and the hydroxyl number lower than 10 mgKOH/g of polymer.

If the polyester is primarily hydroxy functional then the hydroxyl number is preferably between 20 and 150 mgKOH/g of polymer (more preferably 20 to 100 mgKOH/g) and the acid number lower than 10 mgKOH/g of polymer.

Where the resulting polymer hybrid is not independently coreactive but the polymers A and B contain reactive functional groups capable of crosslinking using a crosslinker, then the binder may be formulated by melt extrusion with crosslinker (usually first employing a premixing stage in a high speed mixer). Additives such as flow promoting agents, catalysts, pigments, compatibilizers and fillers may also be included. As mentioned before, typical crosslinkers include blocked isocyanates, multifuntional epoxides (e.g. triglycidylisocyanurate) and polyhydroxy alkylamides (e.g. Primid XL 552). Choice and level of crosslinker will be determined by the type and level of the functionality present in the polymer hybrid. The extrudate may be ground and screened, and typically the fraction with a particle size smaller than 90–130 μm is applied to a substrate by means of an electrostatic spraying device. Suitable substrates are, for example metal, plastics and glass. The extrudate fraction and substrate are then typically cured for 10 to 30 minutes in a muffle furnace at a temperature between 130° C. and 240° C. The resulting layer of the wholly or partly coated substrate may, depending on the constituent polymers of the hybrid and their levels therein, exhibit an excellent combination of chemical resistance, such as acetone and petrol resistance, gloss or other desired appearance, flow, weather resistance and mechanical properties such as impact resistance or flexibility.

The binder compositions of the invention are highly suitable, for example, in powder coatings in the automotive industry. In this application they may serve as the basis for a clear top coat.

The compositions of the invention may be formulated with any additive(s) appropriate to the particular powder coating application(s) envisaged, e.g. pigments, dyes, curing agents, viscosity controllers, levelling agents, gelation aids, ultra-violet stabilisers, thermal stabilisers, and antioxidants. These may in principle sometimes be incorporated during the polymerisation to form the polymer hybrid but more usually are incorporated post-polymerisation, by formulating with the granular product. Any suitable formulation technique may be used, e.g. simple blending or, if appropriate to the additive, extrusion with the granular product (usually preceded by a mixing stage in a high speed mixer) and regranulation of the extrudate (as mentioned above).

The powder coating compositions of the invention may be used in a variety of different powder coating techniques to achieve coatings on articles for a variety of objectives such as decoration, protection (to weather, corrosion, scratching, abrasion etc.), and insulation. The main powder coating techniques are fluidised bed, electrostatic spray, electrostatic fluidised bed, plasma spray, and hot flocking, as well as combinations and variants of these methods.

Powder-coating processes have many advantages over conventional painting. Most significant is that they are ecologically acceptable because they minimise pollution. Since there are no solvents involved, there is no air pollution, and no solvent-recovery system is required. Essentially, all the powder is recycled.

The present invention is now further illustrated by reference to the following examples. Unless otherwise specified all parts, percentages and ratios are on a weight basis.

EXAMPLE 1 to 7

Powder coating acrylic copolymer-fluorocopolymer compositions according to the invention (Examples 1 to 7) were prepared using the following procedure.

All polymerisations were conducted in a 4-necked reaction flask using a metal stirrer.

Partially hydrolysed polyvinyl acetate (98% hydrolysis; 1.5 g), $Na_2SO_4$ (0.5 g) and defoamer were weighed into the reaction flask containing 470 g of distilled water. The flask was heated to 85° C. under stirring. A monomer mixture (150 g) of n-butyl acrylate (BA), methyl methacrylate (MMA), styrene (St), 2-hydroxyethyl methacrylate (HEMA) and methacrylic acid (MAA) in weight ratio BA (18.8)/MMA (70.3)/St (2.0)/HEMA (7.7)/MAA (1.2) was weighed out separately into a container. This will yield an acrylic copolymer having both hydroxyl and carboxyl functionalities.

Various levels of a commercially available functionalised fluorocopolymer, "Lumiflon" LF916 (Asahi Glass), having both hydroxyl and carboxyl functionalities, were used as the fluorocopolymer component B of the compositions. This copolymer is considered to comprise units of chlorotrifluoroethylene and certain other vinyl ether compounds. The exact composition of this copolymer was not indicated and is therefore not known to us.

The required amount of "Lumiflon" LF916 (in acetone or as solid) and benzoyl peroxide initiator, (7.5 g) together with alpha-methylstyrene as chain transfer agent (3.3 parts per hundred monomer) were dissolved in the acrylic monomer mixture with shaking. The mixture was then transferred to a dropping funnel and fed to the reactor at 85° C., over a period of two hours. An extra amount of the suspension stabiliser (0.5 g/80 g. water), was simultaneously fed when half of the monomer feed was completed, and continued until the end of monomer feed. The reaction temperature was maintained at 85° C., throughout the reaction and was allowed to continue for 1 hour after the completion of monomer addition. The reaction contents were then cooled slowly under stirring. The suspension was then filtered and washed with distilled water and allowed to dry. All polymerisations produced very clean, coagulum or aggregate free suspensions indicating that the fluoropolymer did not phase separate during the polymerisations. Monomer to polymer conversions of 95–98% were achieved. The details of the polymerisations and of the resulting composite polymer compositions are given in the following table.

| Ex No | Level 916 in acrylic | | Composite Properties | |
|---|---|---|---|---|
| | ppH | % | Mn | OH value (mg KOHg$^{-1}$) |
| Control | 0 | 0 | 12809 | 33.2 |
| 1 | 6.7 | 6.3 | 14460 | 34.8 |
| 2 | 10 | 9.1 | 13623 | 35.6 |
| 3 | 20 | 16.6 | 11623 | 37.4 |
| 4 | 34 | 25.4 | 10786 | 40.0 |
| 5 | 50 | 33.3 | 8616 | 41.9 |
| 6 | 65 | 39.4 | 9926 | 43.7 |
| 7 | 100 | 50 | 13228 | 47.9 |

The Mn of the fluoropolymer (with no acrylic polymer) was 10239.

Some of the above powder coating compositions, viz those of Examples 1, 4, 6 and 7, were formulated with a blocked isocyanate crosslinking agent and TiO$_2$ pigment and used for powder coating. Control compositions based on "Lumiflon" LF916 fluoropolymer alone (with no acrylic polymer) and the acrylic copolymer alone (with no fluoropolymer) were also formulated and used in powder coating. The components and the amounts used are shown in the following table. The components were blended in a high speed mixer (Henschel) and then melt-blended using a twin screw extruder at 100° C. The extrudate was chilled and flaked on a chill roll at 40° C., ground in a micromill and sieved through a 90 μm mesh screen. The resulting powder was then electrostatically sprayed onto earthed steel panels using an electrostatic spray gun. The coating panels were then baked (10 minutes at 200° C.) to give hard glossy coatings (film thicknesses were between 50 and 70 μm. Some properties of the coatings are also shown in the following table.

EXAMPLES 8 to 12

Powder coating acrylic copolymer-polyester compositions according to the invention were prepared in these examples.

The polyester used in the composite compositions was prepared as follows.

To a 3 liter flask equipped with stirrer, a thermometer and a distillation set-up was charged 1075 g neopentyl glycol, 29.4 g trimethylolpropane, 376.4 isophthalic acid, 476.4 g terephthalic acid, 550 g 1,4-cyclohexanedicarboxylic acid and 3 g Fascat 4101 C (Sn-based catalyst; Atochem).

While the reaction mixture was being stirred, a light nitrogen flow was passed over it. The temperature was incrementally increased to a maximum of 235° C. and a total of 335 ml of water distilled off. The reaction was continued until an acid number of 7 mgKOH/g was reached. The reaction mixture was then cooled to 180° C. and 437 g of 1,4 cyclohexanedicarboxylic acid added. The reaction mixture temperature was raised to 235° C. and the reaction continued under vacuum (200 mbar) for 2 hours until an acid value of 34.6 mgKOH/g was reached. The resin was then cooled.

The polyester was characterised by a final acid value of 34.6 mgKOH/g, an ICI cone and plate viscosity of 40 poise at 185° C., and a number average molecular weight Mn (using gel permeation chromatography, polystyrene standard) of 6624.

Various levels of the above-prepared polyester were used as the component B for compositions of the invention. The following procedure was used to prepare the compositions. A 1 liter flask equipped with stirrer, thermometer and condenser was charged with polyacrylic acid stabiliser ("Acrysol" Al, 1.2 g), Na$_2$SO$_4$ (1.2 g) and distilled water (350 g). The flask contents were then heated to 85° C. with stirring under nitrogen.

| | Polymer(s) used | | | | | |
|---|---|---|---|---|---|---|
| Component | "Lumiflon" 916 alone | Acrylic Copolymer alone | Comp of Ex 1 | Comp of Ex 4 | Comp of Ex 6 | Comp of Ex 7 |
| Amounts (g) | | | | | | |
| Polymer(s) | 46.3 | 51.0 | 50.5 | 49.2 | 48.2 | 47.5 |
| Blocked Isocyanate | 15.7 | 11.0 | 11.5 | 12.8 | 13.8 | 14.5 |
| TiO$_2$ Pigment | 38.0 | 38.0 | 38.0 | 38.0 | 38.0 | 38.0 |
| Properties | | | | | | |
| Gel time at 149° C. (secs) | — | 170 | 135 | 78 | 69 | 56 |
| 60° C. Gloss (% reflected light at this angle) | — | 81 | 86 | 83 | 81 | 79 |
| Powder stability overnight at 40° C. (10 = perfect, no sintering; 0 = solid) | 2 | 9 | 9 | 4 | 2 | 2 |
| Exterior durability in Weatherometer (time to 50% loss of gloss in hours) | >5000 | 1000 | — | — | — | 3300 |

To the flask was then added, over a 10 minute period, the acrylic monomer mixture described below. [The monomer mixture was prepared by dissolving with stirring the polyester as described above into the monomers at room temperature until complete dissolution. The initiator benzoyl peroxide BPO (70%) was then dissolved in the total mixture]. The reaction mixture was held at 85° C. for 2 hours and then for a further 1 hour at 90° C. prior to cooling to 40° C.; the suspension was filtered (125 μm) and the product collected, crushed and dried. Monomer to polymer yields were typically 97–99%.

| Acrylic Monomer Composition | |
|---|---|
| methyl methacrylate | 192.4 g |
| n-butyl acrylate | 87.6 g |
| styrene | 77.64 g |
| α-methyl styrene | 23.8 g |
| methacrylic acid | 19.8 g |

The details of the polymerisations and of the resulting composite polymer compositions are given in the following table.

| Example No | Control | 8 | 9 | 10 | 11 | 12 |
|---|---|---|---|---|---|---|
| Ratio Acrylic:Polyester | 100:0 | 90:10 | 80:20 | 70:30 | 60:40 | 50:50 |
| wt Acrylic monomer mixture (g) | 100 | 180 | 160 | 140 | 120 | 100 |
| wt Polyester (g) | 0 | 20 | 40 | 60 | 80 | 100 |
| wt BPO (70%) (g) | 15.7 | 14.14 | 12.57 | 11 | 9.43 | 7.85 |
| Composite Properties | | | | | | |
| Acid value *(mgKOHg$^{-1}$) | 35.3 | 32.8 | 35.6 | 32.1 | 34.1 | 33.1 |
| Viscosity at 185° C. | 215 | 190 | 175 | 160 | 115 | 80 |
| Mn | 8851 | 8468 | 8533 | 8105 | 7978 | 7760 |

(*The hydroxyl numbers of all polymers were below 10 mgKOHg$^{-1}$)

The hybrid 60/40 acrylic-polyester powder coating composition of Example 11 (prepared above) was formulated with triglycidyl isocyanurate (TGIC) crosslinking agent TiO$_2$ pigment and other components and used for powder coating in order to obtain a desired textured finish. Control compositions based on the polyester alone and the acrylic polymer alone were also formulated. The components were blended in a high speed mixer (Henschel) and then melt-blended in a twin screw extruder at 100° C. The extrudate was chilled and flaked on a chill roll at 40° C., ground in a micromill and sieved through a 125 μm mesh screen. The resulting powder was then electrostatically sprayed onto earthed steel panels using an electrostatic spray gun. The coated panels were then baked (10 minutes at 200° C.) to give glossy films for the controls and a desired textured leatherette effect finish for the invention composition. Film thicknesses were between 50 and 70 μm. Some properties of the coatings are also shown in the following table.

| | Polymer(s) used | | |
|---|---|---|---|
| Component | polyester alone | Acrylic Copolymer alone | Comp of Ex 11 |
| Amounts (g) | | | |
| Polymer(s) | 59.38 | 60.98 | 60.98 |
| TGIC | 4.78 | 4.59 | 4.59 |
| TiO$_2$ Pigment | 34.13 | 32.79 | 32.79 |
| Flow Modifier | 1.14 | 1.10 | 1.10 |
| Benzoin (solid coalescing agent) | 0.57 | 0.55 | 0.55 |
| Properties | | | |
| 60° C. Gloss (% reflected light as this angle) | 86 | 86 | 61.5 |
| Reverse Impact Resistance (in.lb) (ASTM D-2794:619) | 40 | <20 | <20 |
| Appearance | Smooth, glossy | Smooth glossy | Textured Leatherette |

We claim:

1. Process for the production of a powder coating composition, said composition comprising a hybrid polymer system in granular form of a polymer A formable from monomer(s) by aqueous suspension polymerisation and a polymer B, different to A, wherein said process comprises forming said hybrid polymer system by dissolving polymer B in monomeric material to be used in the formation of polymer A, polymerising the monomer(s) to form polymer A using an aqueous suspension polymerisation process, and removing the aqueous phase to form a hybrid of the polymers A and B in granular form, and wherein polymer A is a polymer formed by the free-radical addition polymerisation of at least one olefinically unsaturated monomer and polymer B is selected from the group consisting of polyester, polyurethane, polyurethane-urea, epoxy polymer, polyamide and fluorocopolymer, and wherein further polymer A and polymer B bear functional groups for imparting curability to the hybrid polymer system, and wherein further the hybrid polymer system formed has a number average molecular weight within the range of from 1500 to 15000.

2. Process according to claim 1 wherein polymer B has a number average molecular weight within the range of from 750 to 30,000.

3. Process according to claim 1 wherein polymer B has functional groups which are selected from one or more of hydroxyl, carboxyl, glycidyl, amino and siloxane groups.

4. Process according to claim 1 wherein said polymer B is a fluorocopolymer or a polyester and the functional groups thereof are selected from one or both of hydroxyl and carboxyl groups.

5. Process according to claim 4 wherein said polymer B is a primarily carboxyl functional polyester having an acid number of between 20 and 150 mgKOH/g of polymer and a hydroxyl number of less than 10 mgKOH/g of polymer.

6. Process according to claim 4 wherein said polymer B is a primarily hydroxyl functional polyester having a hydroxyl number of between 20 and 150 mgKOH/g of polymer and an acid number of less than 10 mgKOH/g of polymer.

7. Process according to claim 1 wherein polymer A has a number average molecular weight within the range of 1500 to 15,000.

8. Process according to claim 1 wherein polymer A is an acrylic copolymer.

9. Process according to claim 1 wherein polymer A has functional groups which are selected from one or more of hydroxyl, carboxyl, glycidyl, amino and siloxane groups.

10. Process according to claim 1 wherein polymers A and B possess functional groups which are different but coreactive so as to be capable of causing self-crosslinking.

11. Process according to claim 1 wherein polymers A and B possess functional groups which are the same and are capable of causing crosslinking by subsequent formulation of the composition with a coreactive component having two or more groups reactive with said same functional groups of polymers A and B and acting as a crosslinking agent.

12. Process according to claim 11 wherein said same functional groups of polymers A and B are carboxyl groups or hydroxyl groups.

13. Process according to claim 1 wherein the number average molecular weight of the hybrid polymer system is within the range of from 2000 to 15,000.

14. Process according to claim 1 wherein the polymers A and B are present in the composition in a weight/weight ratio within the range of from 95/5 to 25/75.

15. In a process of powder coating which comprises applying a powder coating to a substrate, the improvement which comprises using, for the powder coating, a powder coating composition made according to the process of claim 1.

* * * * *